(12) United States Patent
Hiramatsu et al.

(10) Patent No.: US 11,067,987 B2
(45) Date of Patent: Jul. 20, 2021

(54) DRIVING ASSISTANCE METHOD AND DRIVING ASSISTANCE DEVICE

(71) Applicant: Nissan Motor Co., Ltd., Yokohama (JP)

(72) Inventors: Machiko Hiramatsu, Kanagawa (JP); Takashi Sunda, Kanagawa (JP); Hwaseon Jang, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 257 days.

(21) Appl. No.: 16/335,586

(22) PCT Filed: Sep. 23, 2016

(86) PCT No.: PCT/JP2016/078040
§ 371 (c)(1),
(2) Date: Mar. 21, 2019

(87) PCT Pub. No.: WO2018/055731
PCT Pub. Date: Mar. 29, 2018

(65) Prior Publication Data
US 2020/0026284 A1    Jan. 23, 2020

(51) Int. Cl.
*G05D 1/00* (2006.01)
*G05D 1/02* (2020.01)
*G08G 1/01* (2006.01)

(52) U.S. Cl.
CPC ......... *G05D 1/0088* (2013.01); *G05D 1/0212* (2013.01); *G08G 1/0125* (2013.01); *G05D 2201/0213* (2013.01)

(58) Field of Classification Search
CPC ......... B60R 2300/00; B60T 1/00; B60T 7/00; B60T 2201/00; B60T 2210/00;
(Continued)

(56) References Cited

U.S. PATENT DOCUMENTS 9,669,827 B1 * 6/2017 Ferguson .......... B60W 50/0097
10,496,091 B1 * 12/2019 Ross .................... G05D 1/0088
(Continued)

FOREIGN PATENT DOCUMENTS

CN    104678832 A    6/2015
JP    2015141476 A    8/2015
(Continued)

*Primary Examiner* — Geepy Pe
*Assistant Examiner* — Sean Patrick Reidy
(74) *Attorney, Agent, or Firm* — Young Basile Hanlon & MacFarlane, P.C.

(57) ABSTRACT

A driving assistance method for an autonomous vehicle requests an occupant in the host vehicle to approve passage through an intersection and, upon receiving approval from the occupant, controls the host vehicle to pass through the intersection. The method comprises detecting a situation at an intersection where the host vehicle is approaching; determining whether or not the host vehicle will need to make a temporary stop at the intersection, based on the detected situation at the intersection; and if it is determined that a temporary stop will be needed, delaying the timing to request the occupant to approve passage through the intersection as compared to the timing that would be used if it was determined that a temporary stop would not be needed.

19 Claims, 8 Drawing Sheets

(58) Field of Classification Search
CPC .............. B60T 2220/00; B60T 2230/00; B60T 2250/00; B60T 2260/00; B60W 30/00; B60W 50/00; B60W 60/00; G01C 3/00; G01C 7/00; G01C 11/00; G01C 21/00; G01C 22/00; G01C 23/00; G01P 1/00; G01P 13/00; G05B 13/00; G05B 15/00; G05B 17/00; G05B 19/00; G05B 21/00; G05B 23/00; G05D 1/00; G05D 1/0088; G05D 1/0212; G05D 2201/0213; G07C 5/00; G07C 11/00; G08B 1/00; G08B 3/00; G08B 5/00; G08B 7/00; G08G 1/00; G08G 1/0125; G09G 5/00; G09G 2310/00; G09G 2320/00; G09G 2354/00

See application file for complete search history.

(56) References Cited

U.S. PATENT DOCUMENTS

| | | | |
|---|---|---|---|
| 2015/0148985 A1 | 5/2015 | Jo | |
| 2015/0248131 A1* | 9/2015 | Fairfield | ............... G05D 1/0038 |
| | | | 701/2 |
| 2016/0041554 A1 | 2/2016 | Takano | |
| 2016/0375768 A1* | 12/2016 | Konet | ..................... G08G 1/166 |
| | | | 348/148 |
| 2017/0057514 A1* | 3/2017 | Toyoda | ............ B60W 30/18154 |
| 2017/0151958 A1 | 6/2017 | Sakuma | |

FOREIGN PATENT DOCUMENTS

| | | |
|---|---|---|
| JP | 2016038853 A | 3/2016 |
| WO | 2015141308 A1 | 9/2015 |
| WO | 2016042978 A1 | 3/2016 |

* cited by examiner

DRIVING ASSISTANCE METHOD AND DRIVING ASSISTANCE DEVICE

TECHNICAL FIELD

The present invention relates to a driving assistance method and device for an autonomous vehicle that requests an occupant in a host vehicle to approve passage through an intersection and, upon receiving approval from the occupant, controls the host vehicle to pass through the intersection.

BACKGROUND

For autonomous vehicles, which perform autonomous vehicle control, Japanese Patent Application Publication No. 2015-141476 has been disclosed as a conventional autonomous driving assistance system that allows the user to perform a driving operation as appropriate even after the autonomous driving control is stopped. In the autonomous driving assistance system disclosed in Japanese Patent Application Publication No. 2015-141476, to allow the user to perform an operation as appropriate even after the autonomous driving control is stopped, the user is informed of the contents of the next and subsequent control operations in the autonomous driving control repetitively at predetermined intervals.

However, in the case of turning right or left at an intersection, it may take a long time to pass through the intersection depending on the situation at the intersection. In such a case, the above conventional autonomous driving assistance system will inform the user of the content of a control operation in the autonomous driving control repetitively at predetermined intervals. The problem with this is that the user has to listen to the guidance of the same content over and over again and therefore feels annoyed.

SUMMARY

The present invention has been proposed in view of the above circumstance, and an object thereof is therefore to provide a driving assistance method and device that can reduce the annoyance experienced by an occupant from guidance given to the occupant.

To solve the above problem, in a driving assistance method and device according to an aspect of the present invention, the situation at an intersection where the host vehicle is approaching is detected, and whether or not the host vehicle will need to make a temporary stop at the intersection is determined based on the detected situation at the intersection. Then, if it is determined that a temporary stop will be needed, the timing to request an occupant to approve passage through the intersection is delayed as compared to the timing that would otherwise be used if it was determined that a temporary stop would not be needed.

According to the present invention, it is possible to reduce the annoyance experienced by the occupant from guidance during passage through an intersection.

DETAILED DESCRIPTION

One embodiment in which the present invention is applied will be described with reference to the drawings.

[Configuration of Driving Assistance System]

Figure 1:
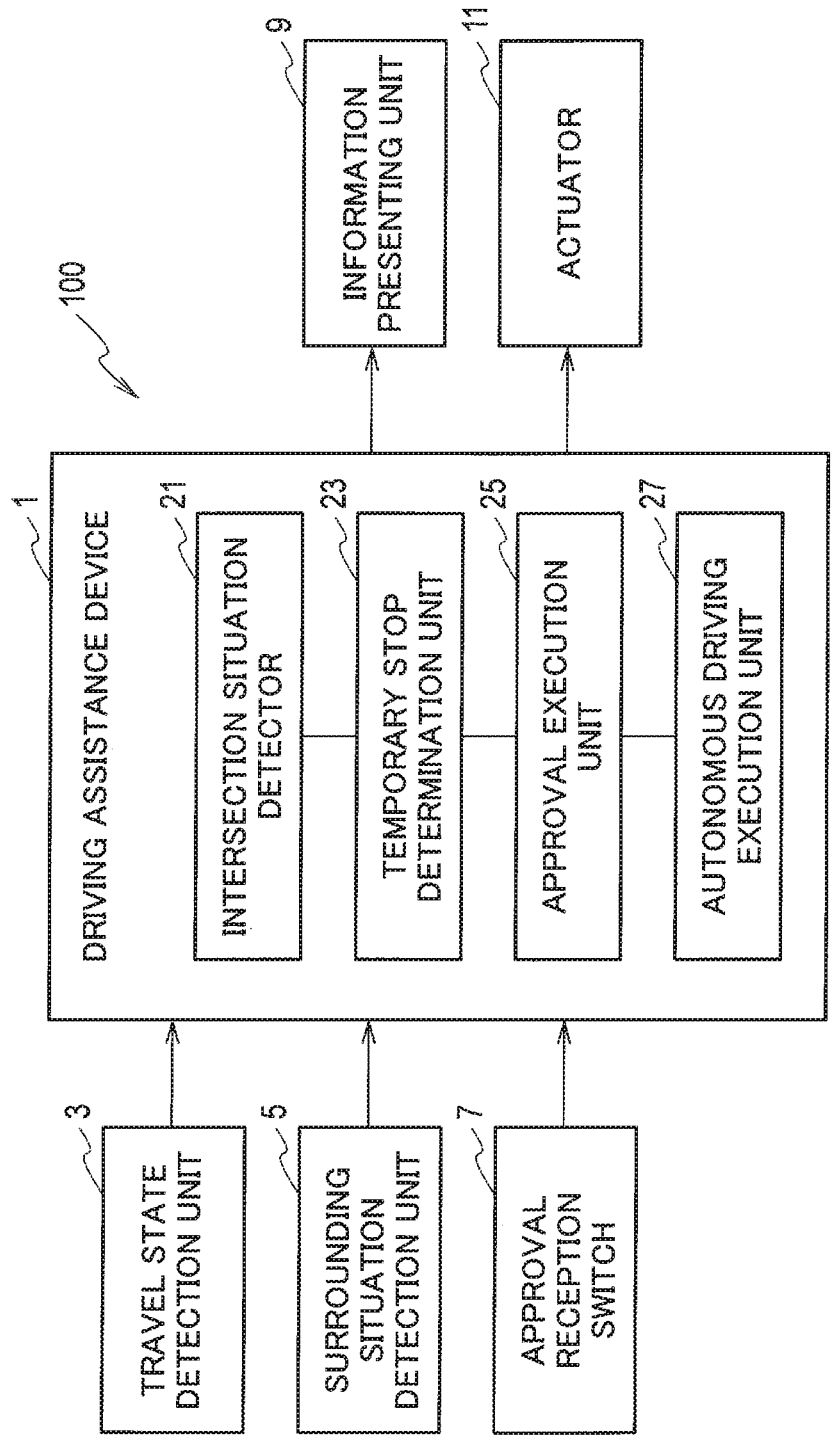
FIG. 1 is a block diagram illustrating the configuration of a driving assistance system including a driving assistance device according to one embodiment of the present invention.

FIG. 1 is a block diagram illustrating the configuration of a driving assistance system including a driving assistance device according to this embodiment. As illustrated in FIG. 1, a driving assistance system 100 according to this embodiment includes a driving assistance device 1, a travel state detection unit 3, a surrounding situation detection unit 5, an approval reception switch 7, and an information presenting unit 9. Further, the driving assistance system 100 is connected to an actuator 11 installed on the vehicle.

The driving assistance device 1 is a controller that assists the driving of an autonomous vehicle. In particular, the autonomous vehicle with the driving assistance device 1 installed thereon executes a process involving requesting an occupant in the host vehicle to approve passage through an intersection and, upon receiving approval from the occupant, controlling the host vehicle to pass through the intersection. Also, the driving assistance device 1 detects the situation at the intersection where the host vehicle is approaching, and determines whether or not the host vehicle will need to make a temporary stop at the intersection, based on the detected situation at the intersection. Then, if determining that a temporary stop will be needed, the driving assistance device 1 controls the timing to request the occupant to approve passage through the intersection such that the timing will be delayed as compared to the timing that would otherwise be used if it was determined that a temporary stop would not be needed. Here, the driving assistance device 1 includes an intersection situation detector 21, a temporary stop determination unit 23, an approval execution unit 25, and an autonomous driving execution unit 27.

The travel state detection unit 3 detects data indicating travel states of the host vehicles such as the location, speed, steering angle, and acceleration of the host vehicle. For example, the travel state detection unit 3 is configured of an in-vehicle network such as the CAN (Controller Area Network) and a navigation device.

The surrounding situation detection unit 5 detects data indicating the situation around the host vehicle such as the distance to an intersection, the display state of a traffic light ahead of the host vehicle, pedestrians in crosswalks, and vehicles in the oncoming lane. For example, the surrounding situation detection unit 5 is configured of a camera, a laser radar, and a navigation device installed on the vehicle. Note that the surrounding situation detection unit 5 may detect the display state of a traffic light by using road-to-vehicle communication. Also, the surrounding situation detection unit 5 may detect pedestrians in crosswalks by using roadto-vehicle communication and/or IC tags in smartphones or the like. Further, the surrounding situation detection unit 5 may detect the presence of vehicles and the congestion situation in the oncoming lane by using vehicle-to-vehicle communication and/or a cloud service linked to a smartphone. Also, the surrounding situation detection unit 5 may detect the situations at crosswalks and the congestion situation in the oncoming lane by referring the history at these locations.

The approval reception switch 7 is a switch which is installed on the vehicle and receives approval to pass through an intersection from the occupant in the vehicle. For example, the approval reception switch 7 is configured as a button displayed on a touchscreen or a push-type approve button (commander). The position where the approval reception switch 7 is provided is on a display, steering wheel, seat, center console, door, inner panel, remote operation terminal, smartphone, or the like. The approval reception switch 7 does not necessarily have to be fixed but may be movable. A movable approval reception switch 7 can improve its operability for the occupant by moving in accordance with the position of the occupant's seat.

The information presenting unit 9 is configured of a display, a head-up display, a meter display unit, a loudspeaker, and so on and presents information such as an approval request or a reason for a temporary stop to the occupant at least aurally or visually.

The actuator 11 is driving means installed to drive components such as the accelerator, brakes, and steering of the host vehicle.

Next, the units constituting the driving assistance device 1 will be described. The intersection situation detector 21 obtains the data on the travel states of the host vehicle detected by the travel state detection unit 3 and the data on the situation around the host vehicle detected by the surrounding situation detection unit 5 and, based on the distance to an intersection, determines whether or not the host vehicle is in a state of approaching an intersection. Then, if the host vehicle is in an approaching state, the intersection situation detector 21 detects the situation at the approaching intersection ahead of the host vehicle. The detection-target intersections include intersections with traffic lights and intersections at which the host vehicle needs to turn right or left. Also, the intersection situation detector 21 predicts the situation at the intersection at the time when the host vehicle passes the position of the stop line at the intersection. For example, from the current speed and location of the host vehicle and the current display state of the traffic light, the intersection situation detector 21 predicts the display state of the traffic light at the time when the host vehicle passes the position of the stop line at the intersection. Further, from the current speed and location of the host vehicle and the current location and relative speed of any oncoming vehicle, the intersection situation detector 21 predicts the state of the oncoming vehicle and the congestion situation at the time when the host vehicle passes the position of the stop line at the intersection. Furthermore, from the current speed and location of the host vehicle and the current location and speed of any crossing pedestrian, the intersection situation detector 21 predicts the state of the crossing pedestrian at the time when the host vehicle passes the position of the stop line at the intersection.

Based on the situation at the intersection detected by the intersection situation detector 21, the temporary stop determination unit 23 determines whether or not the host vehicle will need to make a temporary stop at the intersection. For example, the temporary stop determination unit 23 determines that a temporary stop will be needed if the traffic light is red or yellow. The temporary stop determination unit 23 also determines that a temporary stop will be needed if a passage permission signal (arrow) in the traveling direction of the host vehicle is not turned on, a pedestrian or the like is crossing the crosswalk at the end of the right turn path, the oncoming lane is congested, an oncoming vehicle is approaching the intersection such that there will only be a short gap time, or other similar situations. The above gap time refers to the length of time between the time when the oncoming vehicle passes the intersection and the time when the host vehicle passes the intersection. The temporary stop determination unit 23 may be configured to measure the time when a predetermined part of each vehicle passes a predetermined position inside the intersection. Different parts of a vehicle pass the predetermined position inside an intersection at different times, thus the part that reaches the particular position in the intersection first may be set as the above-mentioned predetermined part of the vehicle.

In accordance with the determination by the temporary stop determination unit 23, the approval execution unit 25 executes a process of requesting the occupant to approve passage through the intersection and receiving approval from the occupant. In particular, if it is determined that a temporary stop will be needed, the approval execution unit 25 controls the timing to request the occupant to approve passage through the intersection such that the timing will be delayed as compared to the timing that would be used if it was determined that a temporary stop would not be needed. Also, the approval execution unit 25 sets an approval reception zone within which approval to pass through the intersection is received from the occupant, before the intersection where the host vehicle is approaching.

The autonomous driving execution unit 27 controls the host vehicle to travel by executing autonomous driving in accordance with a destination input by the occupant in the host vehicle and a travel route set based on the situation around the host vehicle. For example, following the travel route, the autonomous driving execution unit 27 turns on the direction indicators and causes the host vehicle to turn right or left at an intersection or to make a temporary stop. Meanwhile, to execute such autonomous driving, the autonomous driving execution unit 27 outputs control signals to the actuator 11.

Note that the driving assistance device 1 is configured of a general-purpose electronic circuit including a microcomputer, a microprocessor, and a CPU and a peripheral device such as a memory. Further, by executing a specific program, the driving assistance device 1 operates as the above-described intersection situation detector 21, temporary stop determination unit 23, approval execution unit 25, and autonomous driving execution unit 27. Each of these functions of the driving assistance device 1 can be implemented with one or more processing circuits. Examples of the processing circuits include programmed processing devices such as processing devices including electric circuits, and also include devices such as application specific integrated circuits (ASICs) and conventional circuit components arranged to execute the functions described in the embodiment.

[Procedure of Driving Assistance Process]

Next, the procedure of a driving assistance process by the driving assistance device 1 according to this embodiment will be described with reference to a flowchart in FIG. 2. The driving assistance process illustrated in FIG. 2 starts when the vehicle's ignition is turned on and travel begins. Note that in the following description, a case where the vehicle makes a right turn will be mainly discussed, but a similar process is applicable to cases where the vehicle makes a left turn. Also, in the following description, a case where left-hand traffic is employed will be mainly discussed, but the process is also applicable to cases where right-hand traffic is employed.

Figure 2:
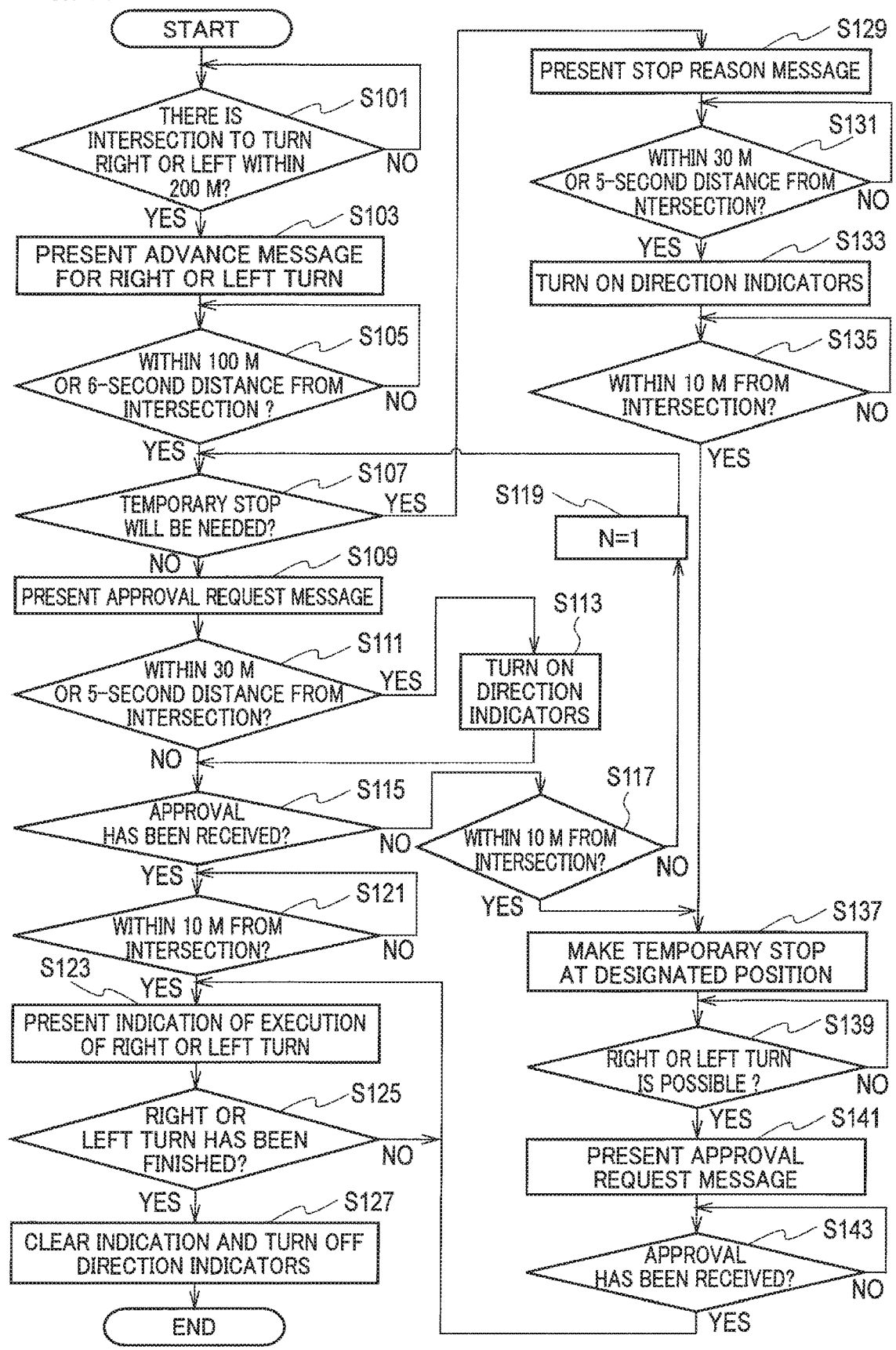
FIG. 2 is a flowchart illustrating the procedure of processing in a driving assistance process by the driving assistance device according to the one embodiment of the present invention.

As illustrated in FIG. 2, firstly in step S101, the intersection situation detector 21 obtains the current location of the host vehicle and detects the distance to the approaching intersection ahead of the host vehicle, to thereby determine whether there is an intersection to turn right or left within 200 m ahead of the host vehicle. If there is no intersection to turn right or left, the process of step S101 is continued. If there is an intersection to turn right or left, the procedure proceeds to step S103.

Figure 3:
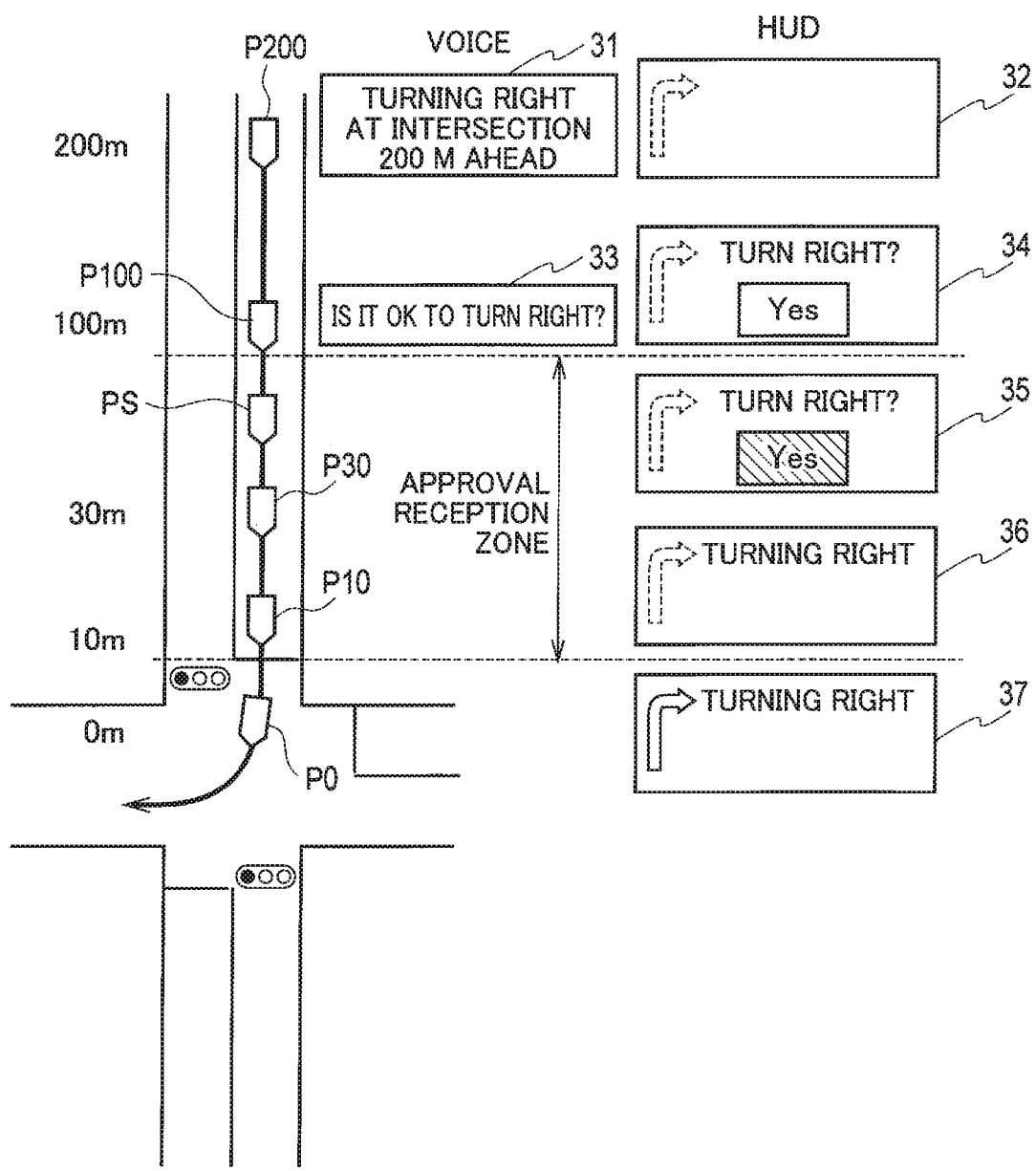
FIG. 3 is a diagram for explaining the driving assistance process in a case where no temporary stop is needed.

In step S103, the autonomous driving execution unit 27 presents an advance message for the right or left turn. For example, as illustrated in FIG. 3, if the host vehicle is to turn right, the autonomous driving execution unit 27 outputs a voice message 31 "Turning right at the intersection 200 m ahead" and an image 32 indicating a right-turn arrow to the information presenting unit 9 at a point P200 which is 200 m before the intersection. The information presenting unit 9 outputs the voice message 31 from the loudspeaker and displays the image 32 on the head-up display (HUD).

In step S105, the intersection situation detector 21 determines whether or not the distance to the approaching intersection ahead of the host vehicle has decreased to within 100 m, or whether or not the host vehicle has approached to within a 6-second distance to the intersection in view of its speed. If the intersection has not approached to within 100 m, the process of step S105 is continued. If the intersection has approached to within 100 m, the procedure proceeds to step 107.

In step S107, the temporary stop determination unit 23 determines whether or not a temporary stop will be needed at the intersection where the host vehicle is approaching, based on the situation at the intersection detected by the intersection situation detector 21. Here, the state of the traffic signal at the intersection where the host vehicle is approaching has already been detected by the intersection situation detector 21. Thus, based on the detected state of the traffic signal, the temporary stop determination unit 23 determines whether or not a temporary stop will be needed at the intersection where the host vehicle is approaching. For example, the temporary stop determination unit 23 determines that no temporary stop will be needed if the traffic light is green, and that a temporary stop will be needed if the traffic light is red or yellow. Further, the temporary stop determination unit 23 determines that no temporary stop will be needed if the traffic light is red or yellow but a passage permission is detected from a traffic signal dedicated for right-left turn (arrow or differently timed traffic signal) as the state of the traffic signal, that is, if a passage permission such as an arrow in the traveling direction of the host vehicle is given.

Meanwhile, the intersection situation detector 21 predicts the situation at the intersection at the time when the host vehicle passes the position of the stop line at the intersection. For example, if detecting that the traffic light is currently red or yellow, the intersection situation detector 21 predicts that the traffic light will be red also at the time when the host vehicle passes the position of the stop line at the intersection. Also, if the traffic light for the roadway is green but the traffic lights for the crosswalks are red, the intersection situation detector 21 predicts that the traffic light for the roadway will be red in a few seconds. Thus, based on such a prediction, the temporary stop determination unit 23 determines that the traffic light will be red at the time when the host vehicle passes through the intersection and therefore determines that a temporary stop will be needed. Also, the intersection situation detector 21 may receive the timing at which the traffic light is switched via road-to-vehicle communication and calculate the time to be taken to reach the intersection from the current speed of the host vehicle and the current distance to the intersection to predict the state of the traffic light at the time when the host vehicle passes the position of the stop line at the intersection.

Figure 4:
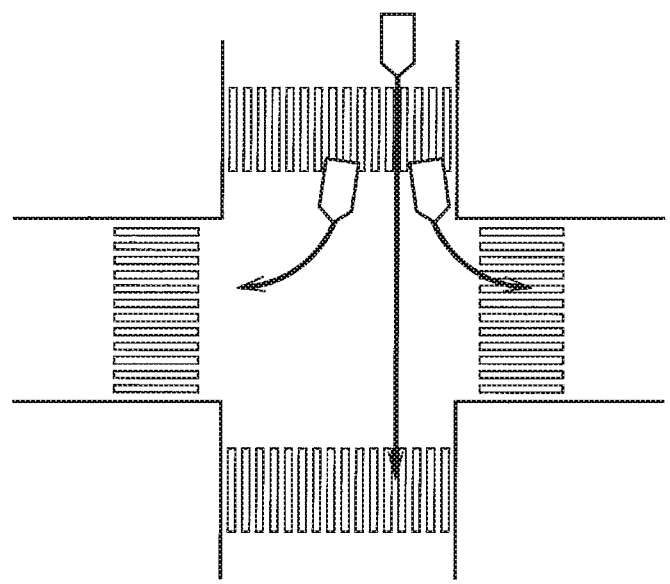
FIG. 4 is a diagram for explaining the driving assistance process in a case where the situations at crosswalks are detected.

Further, since the intersection situation detector 21 has already detected the situations at the crosswalks at the intersection where the host vehicle is approaching, the temporary stop determination unit 23 may determine whether or not a temporary stop will be needed at the intersection based on the detected situations at the crosswalks. For example, the temporary stop determination unit 23 determines that a temporary stop will be needed if a pedestrian, a bicycle, or the like is crossing the crosswalk ahead of the host vehicle in the traveling direction, and determines that no temporary stop will be needed if no pedestrian, bicycle, or the like is crossing the crosswalk. Here, as illustrated in FIG. 4, the target crosswalk varies depending on the traveling direction of the host vehicle, whether the host vehicle is turning right, turning left, or traveling straight. Thus, the temporary stop determination unit 23 determines that a temporary stop will be needed, upon detection of a pedestrian or a bicycle currently crossing the target crosswalk ahead of the host vehicle in the traveling direction or upon detection of a pedestrian or a bicycle predicted to be crossing the crosswalk when the host vehicles reaches it. That is, the intersection situation detector 21 predicts the situation at the target crosswalk from the travel route and the speed of the host vehicle, the distance to the crosswalk, the distance to any target object present around the intersection, and its traveling direction and speed, and the temporary stop determination unit 23 determines based on this prediction whether or not a temporary stop will be needed.

Also, since the intersection situation detector 21 has already detected whether or not the oncoming lane of the road on which the host vehicle is traveling is congested, the temporary stop determination unit 23 may determine whether or not a temporary stop will be needed at the intersection based on the detected congestion situation in the oncoming lane. The intersection situation detector 21 measures the speeds of other vehicles traveling in the oncoming lane, the inter-vehicle distances between them, and so on to detect congestion. For example, the intersection situation detector 21 determines that the oncoming lane is congested if detecting at least one oncoming vehicle traveling at 30 km/h or lower within an approximately 100 m from the host vehicle. Note that the speed threshold for the determination may be changed in accordance with the type of road or the speed limit. For example, the threshold is set at 30 km/h or lower when the speed limit is 50 km/h or higher, and the threshold is set at 20 km/h or lower when the speed limit is 40 km/h or lower. Meanwhile, as for the congestion detection method, congestion may be sensed with a sensor installed on the host vehicle or detected via road-to-vehicle communication or vehicle-to-vehicle communication.

Figure 5:
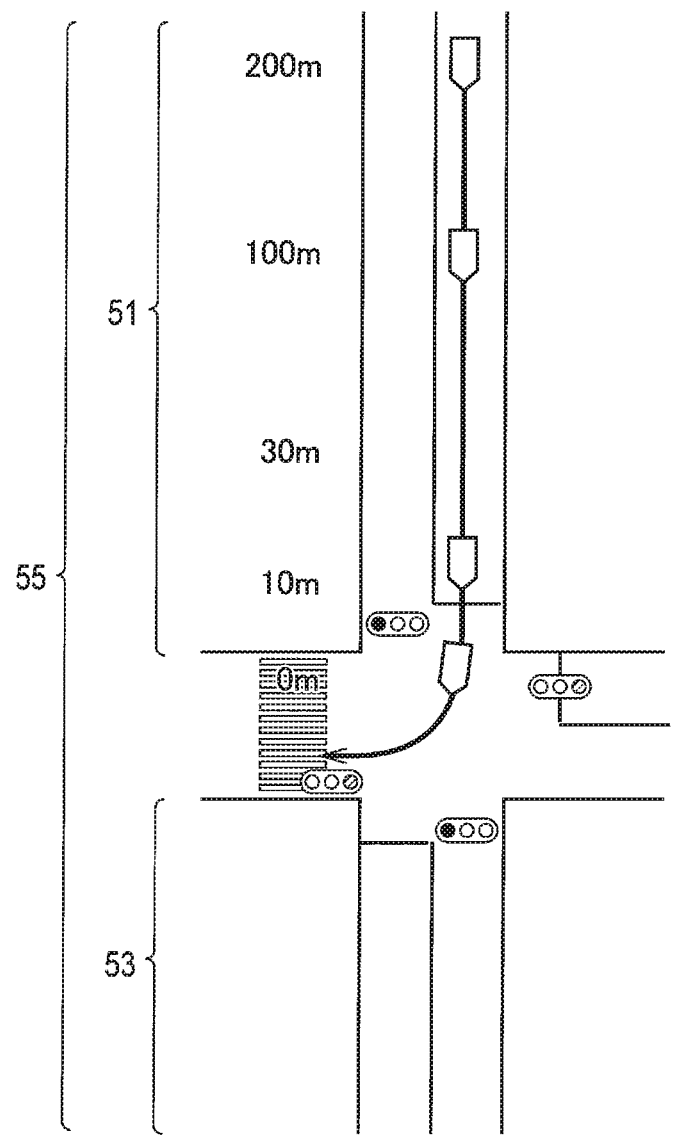
FIG. 5 is a diagram for explaining the driving assistance process in a case where an oncoming lane is congested.

Also, as illustrated in FIG. 5, the congestion detection range may be a zone 51 between the host vehicle and the approaching intersection or a zone 53 on the other side of the intersection where the host vehicle is approaching. Still alternatively, the congestion detection range may be a zone 55 covering the zones 51 and 53 and the inside of the intersection.

Figure 6:
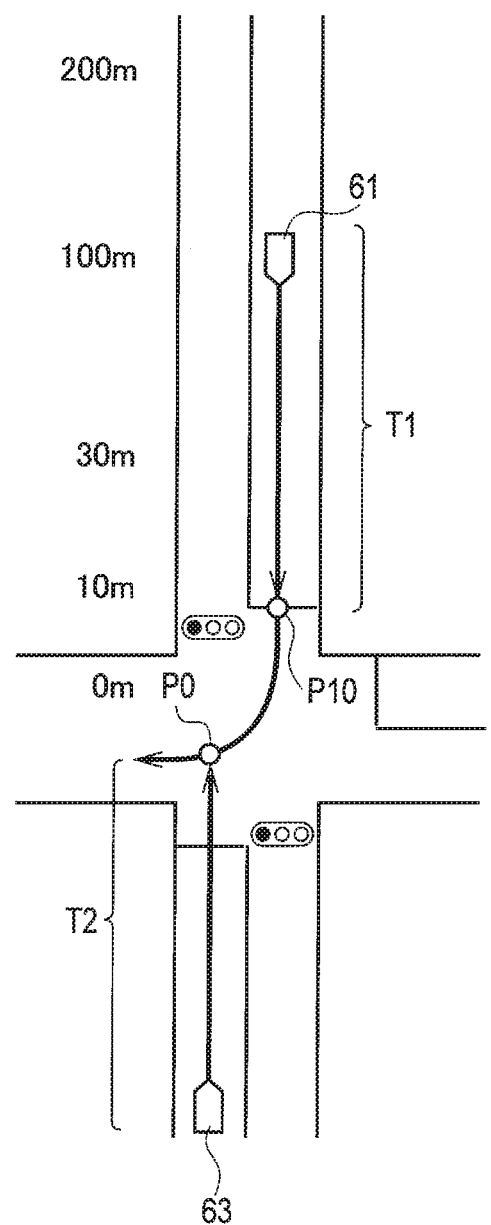
FIG. 6 is a diagram for explaining the driving assistance process in a case where an oncoming vehicle is approaching an intersection.

Further, since the intersection situation detector 21 has already detected any oncoming vehicle that is to enter the intersection where the host vehicle is approaching, the temporary stop determination unit 23 may determine whether or not a temporary stop will be needed at the intersection based on the gap time between the detected oncoming vehicle and the host vehicle. The gap time refers to the difference between the time when the oncoming vehicle reaches the intersection and the time when the host vehicle reaches the intersection. The gap time in a point when the host vehicle starts a right turn at an intersection will be described with reference to FIG. 6. As illustrated in FIG. 6, assuming that the time to be taken for a host vehicle 61 to reach a stop line position P10 from the current location is T1 seconds and the time to be taken for a detected oncoming vehicle to reach an intersection P0 from its location is T2 seconds, T2−T1 is the gap time.

Figure 7:
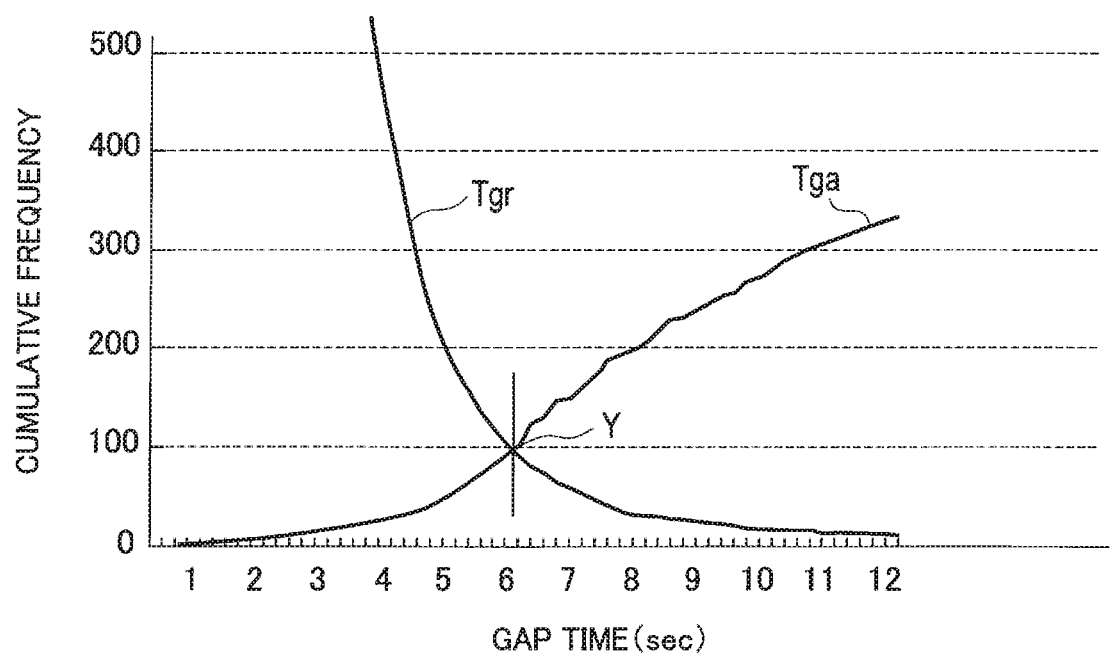
FIG. 7 is a diagram for explaining a method of setting a gap time to be applied to autonomous driving.

Here, a method of determining whether or not a temporary stop will be needed based on the gap time will be described. An accumulation of data on the gap time at the start point of a right turn at an intersection indicates that drivers attempting to turn right at an intersection make decision between making the right turn and not making the right turn. FIG. 7 is a diagram illustrating an example the accumulation of the gap time for each of the decisions made during an attempt to turn right at an intersection, between making the right turn and not making the right turn. As illustrated in FIG. 7, by accumulating a gap time Tga as a series of gap times given by drivers who make a right turn and a gap time Tgr as a series of gap times given by drivers who do not make a right turn, a cumulative frequency distribution can be obtained for each gap time. A critical gap Y is present as the gap time at which the cumulative frequency is equal between the gap time Tga, given by those who make a right turn, and the gap time Tgr, given by those who do not make a right turn, (50% making a right turn and 50% not making a right turn), and is approximately six seconds in FIG. 7. Then, if the gap time is six seconds, a half of drivers will make a right turn and the other half of the drivers will not make a right turn. Thus, if T2−T1<6 seconds, the temporary stop determination unit 23 determines that a temporary stop will be needed. To secure greater safety, the gap time may be set at seven to eight seconds. Note that the location of the oncoming vehicle and the time to be taken for it to reach the intersection may be sensed by the host vehicle by using map data or obtained by using road-to-vehicle communication or vehicle-to-vehicle communication.

If it is determined that no temporary stop will be needed as a result of determining whether or not a temporary stop will be needed in step S107 as above in accordance with the state of the traffic signal, the congestion situation in the oncoming lane, the situations at the crosswalks, and the gap time with any oncoming vehicle, the procedure proceeds to step S109. On the other hand, if it is determined that a temporary stop will be needed, the procedure proceeds to step S129.

Firstly, the case where it is determined that no temporary stop will be needed will be described. In step S109, the approval execution unit 25 presents an approval request message to request the occupant to approve passage through the intersection. Specifically, the approval execution unit 25 presents the approval request message if the number of times N the approval request message has been presented is 0, that is, if the approval request message has never been presented for the intersection where the host vehicle is approaching. For example, as illustrated in FIG. 3, if the host vehicle is to turn right, the approval execution unit 25 outputs a voice message 33 "Is it ok to turn right?" and an image 34 displaying a right-turn arrow and an indication "Yes", which prompts approval, to the information presenting unit 9 at a point P100 which is 100 m before the intersection. As a result, the voice message 33 is output from the loudspeaker of the information presenting unit 9 and the image 34 is displayed on the head-up display of the information presenting unit 9.

Here, based on the situation at the intersection, the approval execution unit 25 may determine whether or not it is necessary to request the occupant to approve passage through the intersection and, if determining that it is not necessary to do so, may not request the occupant to approve passage through the intersection. For example, the approval execution unit 25 may not request the occupant for approval if the host vehicle is in a completely controlled road environment, such as inside a structure in a private land or if the host vehicle can reliably recognize the state of the traffic lights and the situation at the oncoming lane via road-to-vehicle communication, vehicle-to-vehicle communication, or the like. Further, the approval execution unit 25 may not request the occupant for approval also if the host vehicle can reliably determine the situation at the intersection based on the day of the week and the time of the day, for example, if the host vehicle can determine that there are no oncoming vehicles since the road is one-way during the morning hours.

Also, the approval execution unit 25 sets an approval reception zone before the intersection where the host vehicle is approaching. This approval reception zone is a zone within which approval to pass through the intersection is received from the occupant. As illustrated in FIG. 3, in a situation where no temporary stop will be needed, the zone from the point P100, which is 100 m before the intersection, to a point P10, which is 10 m before the intersection and the position of the stop line, is set as the approval reception zone.

In step S111, the intersection situation detector 21 determines whether or not the distance to the approaching intersection ahead of the host vehicle has decreased to within 30 m, or whether or not the host vehicle has approached to within a 5-second distance to the intersection in view of its speed. If the intersection has not approached to within 30 m, the procedure proceeds to step 115. If the intersection has approached to within 30 m, the procedure proceeds to step 113.

In step S113, the autonomous driving execution unit 27 turns on the direction indicators on the side toward which the host vehicle is about to turn. Here, in the case where the host vehicle is to turn at the intersection by following a travel route set in advance, the autonomous driving execution unit 27 turns on the direction indicators regardless of whether or not approval has been requested or received. Specifically, the autonomous driving execution unit 27 turns on the direction indicators of the host vehicle regardless of whether the occupant has been requested to approve passage through the intersection or whether approval to pass through the intersection has been received from the occupant.

In step S115, the approval execution unit 25 determines whether or not approval has been received from the occupant within the approval reception zone. Specifically, the approval execution unit 25 determines whether or not the occupant has approved the right or left turn of the host vehicle. If the approval has been received from the occupant, "Yes" in an image 35 is highlighted as illustrated in FIG. 3 to indicate that the approval has been given. The procedure then proceeds to step S121. On the other hand, if no approval has been received from the occupant, the procedure proceeds to step S117. Note that the approval execution unit 25 may adjust the image presented to the occupant when he or she is requested for approval such that the closer the host vehicle approaches the intersection, the more likely the occupant will select the image. Examples include increasing the size of "Yes" in the image 35 the closer the host vehicle approaches the intersection, increasing the area on the display for responding to the pressing of "Yes" in the image 35 the closer the host vehicle approaches the intersection, and so on.

In step S117, the intersection situation detector 21 determines whether or not the distance to the approaching intersection ahead of the host vehicle has decreased to within 10 m, that is, whether or not the host vehicle has reached the position of the stop line at the intersection. If the host vehicle has not reached the 10-m position from the intersection, the procedure proceeds to step S119, the number of times N in which the approval request message has been presented is set to "1", and the procedure returns to step S107. On the other hand, if the host vehicle has reached the 10-m position from the intersection, the procedure proceeds to step S137. In step S137 to be described later, the host vehicle is caused to make a temporary stop at a designated position. Thus, if approval to pass through the intersection is not received from the occupant within the approval reception zone, the host vehicle will be caused to make a temporary stop at the intersection.

On the other hand, if approval have been received in step S115, the intersection situation detector 21 determines in step S121 whether or not the distance to the approaching intersection ahead of the host vehicle has decreased to within 10 m, that is, whether or not the host vehicle has reached the position of the stop line at the intersection. In this step, as illustrated in FIG. 3, an image 36 indicating that the right turn is about to be made is displayed. If the host vehicle has not reached the 10-m position from the intersection, the intersection situation detector 21 continues the process of step S121. If the host vehicle has reached the 10-m position from the intersection, the procedure proceeds to step S123.

In step S123, the autonomous driving execution unit 27 presents an indication of execution of the right or left turn. For example, as illustrated in FIG. 3, the autonomous driving execution unit 27 outputs an image 37 displaying the right-turn arrow with a solid line to the information presenting unit 9 at a position P0 inside the intersection. As a result, the image 37 is displayed on the head-up display of the information presenting unit 9.

In step S125, the autonomous driving execution unit 27 determines whether or not the right or left turn of the host vehicle has been finished. If the right or left turn has not been finished, the procedure returns to step S123 to continue presenting the indication of the execution. If the right or left turn has been finished, the procedure proceeds to step S127.

In step S127, the autonomous driving execution unit 27 clears the indication of execution of the right or left turn and turns off the direction indicators. Subsequently, the driving assistance process is repeated until the vehicle's ignition is turned off. The driving assistance process according to this embodiment is terminated when the ignition is turned off.

Figure 8:
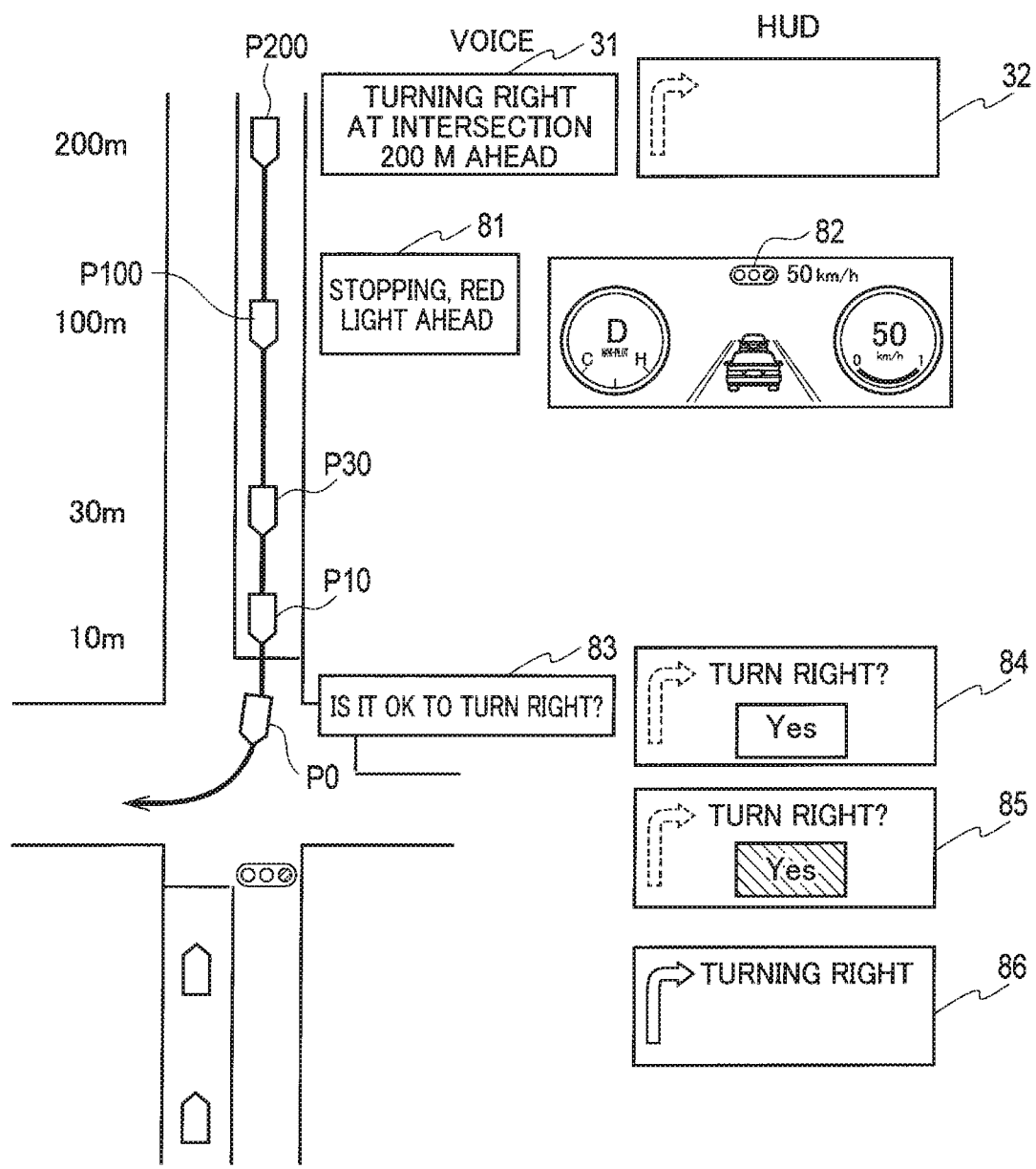
FIG. 8 is a diagram for explaining the driving assistance process in a case where a temporary stop is needed.

Next, the case where it is determined in step S107 that a temporary stop will be needed will be described. In step S129, the temporary stop determination unit 23 presents a stop reason message. For example, as illustrated in FIG. 8, in the case of stopping at a red light, the temporary stop determination unit 23 outputs a command to output a voice message 81 "Stopping, red light ahead" and turn on a red-light icon 82 in the meter display unit at the point P100, which is 100 m before the intersection. As a result, the voice message 81 is output from the loudspeaker of the information presenting unit 9, and the red-light icon 82 in the meter display unit is turned on. Other examples of the voice message include "Stopping, oncoming vehicle ahead", "Stopping, pedestrian ahead", and so on. Also, other display examples include displaying an oncoming vehicle or pedestrian icon on the display, displaying an illumination, and so on. Note that in the case where it is determined that a temporary stop will be needed, the reason for the temporary stop will be presented to the occupant at least aurally or visually regardless of whether the occupant has been requested to approve passage through the intersection or whether approval to pass through the intersection has been received from the occupant.

In step S131, the intersection situation detector 21 determines whether or not the distance to the approaching intersection ahead of the host vehicle has decreased to within 30 m, or whether or not the host vehicle has approached to within a 5-second distance to the intersection in view of its speed. If the intersection has not approached to within 30 m, the process of step S131 is continued. If the intersection has approached to within 30 m, the procedure proceeds to step 133.

In step S133, the autonomous driving execution unit 27 turns on the direction indicators on the side toward which the host vehicle is about to turn. Here, in the case where the host vehicle is to turn at the intersection by following a travel route set in advance, the autonomous driving execution unit 27 turns on the direction indicators regardless of whether or not approval has been requested or received. Specifically, the autonomous driving execution unit 27 turns on the direction indicators of the host vehicle regardless of whether the occupant has been requested to approve passage through the intersection or whether approval to pass through the intersection has been received from the occupant.

In step S135, the intersection situation detector 21 determines whether or not the distance to the approaching intersection ahead of the host vehicle has decreased to within 10 m, that is, whether or not the host vehicle has reached the position of the stop line at the intersection. If the host vehicle has not reached the 10-m position from the intersection, the process of step S135 is continued. On the other hand, if the host vehicle has reached the 10-m position from the intersection, the procedure proceeds to step S137.

In step S137, the autonomous driving execution unit 27 causes the host vehicle to make a temporary stop at the designated position. For example, in a situation where the traffic light is red or the intersection is one requiring a temporary stop, the autonomous driving execution unit 27 causes the host vehicle to make a temporary stop at the stop line. In a situation where the host vehicle has to wait to turn right, the autonomous driving execution unit 27 causes the host vehicle to make a temporary stop inside the intersection. Also, in a situation where there is a preceding vehicle, a crossing pedestrian, or the like, the autonomous driving execution unit 27 causes the host vehicle to make a temporary stop before it. Note that if it has been determined that a temporary stop will be needed, the autonomous driving execution unit 27 causes the host vehicle to make a temporary stop at the intersection regardless of whether the occupant has been requested to approve passage through the intersection or whether approval to pass through the intersection has been received from the occupant.

In step S139, the autonomous driving execution unit 27 determines whether or not the host vehicle can turn right or left, based on the situation at the intersection detected by the intersection situation detector 21. The determination may be performed by a method similar to the method of the above-mentioned determination on whether or not a temporary stop will be needed in step S107. For example, the autonomous driving execution unit 27 determines whether or not the host vehicle can turn right or left in accordance with the state of the traffic signal, the congestion situation in the oncoming lane, the situation at the crosswalk, and the gap time with any oncoming vehicle. If it is determined that the host vehicle cannot turn right or left, the process of step S139 is continued. If it is determined that the host vehicle can turn right or left, the procedure proceeds to step S141. In sum, after the reason for the necessity of the temporary stop is solved, the procedure proceeds to step S141, in which the occupant is requested to approve passage through the intersection. Note that this embodiment has been described based on the case where the occupant is not requested to approve passage through the intersection when it is determined that a temporary stop will be needed. However, there are cases where the occupant has already been requested to approve passage through the intersection when it is determined that a temporary stop will be needed. Examples include a case where an oncoming vehicle is detected after requesting approval, a case where the traffic light turns from yellow to red after requesting approval, and so on. In these cases, the occupant is requested to approve passage through the intersection again after the reason for the necessity of the temporary stop is solved.

In step S141, the approval execution unit 25 presents the approval request message to request the occupant to approve passage through the intersection. For example, as illustrated in FIG. 8, if the host vehicle is to turn right, the approval execution unit 25 outputs a voice message 83 "Is it ok to turn right?" and an image 84 displaying a right-turn arrow and an indication "Yes", which prompts approval, to the information presenting unit 9 at the position P0 inside the intersection. As a result, the voice message 83 is output from the loudspeaker of the information presenting unit 9 and the image 84 is displayed on the head-up display of the information presenting unit 9. As described above, the approval execution unit 25 requests approval at the position of the temporary stop and receives approval at this position. Thus, in a situation where a temporary stop is needed, the approval reception zone is the position of the temporary stop.

Here, in a situation where no temporary stop will be needed, like the situation described with FIG. 3, approval is requested when the host vehicle is at the point P100, which is 100 m from the intersection. On the other hand, in a situation where a temporary stop will be needed, approval is requested when the host vehicle is at the position P0 inside the intersection, as illustrated in FIG. 8. Thus, if it is determined that a temporary stop will be needed, the timing to request the occupant to approve passage through the intersection is delayed as compared to the timing that would otherwise be used if it was determined that a temporary stop would not be needed. In this way, even if the time to be taken to pass through the intersection is long due to a certain situation thereat, an approval request will not be presented repetitively. This can reduce the annoyance experienced by the occupant. For example, in the conventional practice, even in a situation where temporary stop will be needed, approval is requested over and over again before the intersection. In this embodiment, however, in a situation where a temporary stop will be needed, approval is requested only at the position of the temporary stop inside the intersection. This prevents an approval request from being presented repetitively and can accordingly reduce the annoyance experienced by the occupant.

In step S143, the approval execution unit 25 determines whether or not approval has been received from the occupant. Specifically, the approval execution unit 25 determines whether or not the occupant has approved the right or left turn of the host vehicle. If approval have not been received from the occupant, the process of step S143 is continued. If approval has been received from the occupant, "Yes" in an image 85 is highlighted as illustrated in FIG. 8 to indicate that the approval has been given. Thereafter, the procedure proceeds to step S123 to present an indication of execution of the right turn illustrated in an image 86 in FIG. 8. After the right turn is finished, the driving assistance process is repeated until the vehicle's ignition is turned off. Then, the driving assistance process according to this embodiment is terminated when the ignition is turned off.

[Advantageous Effects of Embodiment]

As described above in detail, in the driving assistance method and device according to this embodiment, the situation at an intersection where the host vehicle is approaching is detected, and whether or not the host vehicle will need to make a temporary stop at the intersection is determined based on the detected situation at the intersection. Then, if it is determined that a temporary stop will be needed, the timing to request the occupant to approve passage through the intersection is delayed as compared to the timing that would be used if it was determined that a temporary stop would not be needed. In this way, it is possible to reduce the annoyance experienced by the occupant from guidance during passage through the intersection.

Also, in the driving assistance method and device according to this embodiment, if it is determined that a temporary stop will be needed based on the situation at the intersection, whether or not the reason for the necessity of the temporary stop is solved is determined and, if it is determined that the reason is solved, the occupant is requested to approve passage through the intersection. In this way, approval is not requested as long as the situation where the temporary stop is needed continues. Hence, it is possible to request the occupant for approval with appropriate timing. This can reduce the annoyance experienced by the occupant.

Further, in the driving assistance method and device according to this embodiment, if the occupant has already been requested to approve passage through the intersection when it is determined that a temporary stop will be needed based on the situation at the intersection, whether or not the reason for the necessity of the temporary stop is solved is determined, and if it is determined that the reason for the necessity of the temporary stop is solved, the occupant is requested again to approve passage through the intersection. In this way, even if approval has already been requested, the approval will not be requested as long as the situation where the temporary stop is needed continues. Hence, it is possible to request the occupant for the approval with appropriate timing. This can reduce the annoyance experienced by the occupant.

Also, in the driving assistance method and device according to this embodiment, if it is determined that a temporary stop will be needed, the host vehicle is caused to make a temporary stop at the intersection regardless of whether the occupant has been requested to approve passage through the intersection or whether approval to pass through the intersection has been received from the occupant. In this way, a decision by the autonomous driving to make a temporary stop is given priority to a decision by the occupant to enter the intersection. This allows safe passage through the intersection.

Further, in the driving assistance method and device according to this embodiment, if it is determined that a temporary stop will be needed, the reason for the temporary stop is presented to the occupant, regardless of whether the occupant has been requested to approve passage through the intersection or whether approval to pass through the intersection has been received from the occupant. In this way, the occupant can figure out the reason for the temporary stop. Hence, it is possible to provide a feeling of safety to the occupant.

Also, in the driving assistance method and device according to this embodiment, if the host vehicle is to turn at the intersection, direction indicators of the host vehicle are turned on regardless of whether approval to pass through the intersection has been requested or whether the approval to pass through the intersection has been received. In this way, it is possible to let the occupant figure out that the host vehicle is turning right or left at the intersection and also let surrounding vehicles recognize that the host vehicle is turning.

Further, in the driving assistance method and device according to this embodiment, whether or not the oncoming lane of the road on which the host vehicle is traveling is congested is detected, and if the oncoming lane is congested, it is determined that the host vehicle will need to make a temporary stop at the intersection. Thus, if the oncoming lane is congested, the host vehicle comes to a temporary stop at the intersection. Hence, it is possible to provide a feeling of safety to the occupant.

Also, in the driving assistance method and device according to this embodiment, whether or not the oncoming lane between the host vehicle and the intersection is congested is detected. Thus, information on vehicles that have passed the intersection is used. Accordingly, it is possible to accurately determine the situation at the intersection.

Further, in the driving assistance method and device according to this embodiment, whether or not the oncoming lane before the intersection where the host vehicle is approaching is congested is detected. Thus, information on the downstream side of the intersection, that is, the side closer to the host vehicle and easier to detect is used. This makes it possible to accurately determine the situation at the intersection.

Further, in the driving assistance method and device according to this embodiment, whether or not the oncoming lane beyond the intersection where the host vehicle is approaching is congested is detected. In this way, information on the upstream side of the intersection, that is, vehicles that are to enter the intersection where the host vehicle passes through is used. This makes it possible to accurately determine the situation at the intersection.

Also, in the driving assistance method and device according to this embodiment, the state of the traffic signal at the intersection where the host vehicle is approaching is detected, and whether or not the host vehicle will need to make a temporary stop at the intersection is determined based on the state of the traffic signal. In this way, the state of the traffic signal can be used to accurately determine whether or not a temporary stop will be needed at the intersection.

Further, in the driving assistance method and device according to this embodiment, it is determined that the host vehicle will not need to make a temporary stop at the intersection, if a passage permission is detected from a traffic signal dedicated for right-left turn as the state of the traffic signal. In this way, the host vehicle can pass through the intersection without any oncoming vehicle or crossing pedestrian and can therefore pass through the intersection safely.

Also, in the driving assistance method and device according to this embodiment, the situation at the intersection at the time when the host vehicle passes the position of the stop line at the intersection is predicted. In this way, it is possible to determine whether or not a temporary stop will be needed by figuring out the actual situation at the time when the host vehicle enters the intersection. The host vehicle can therefore pass through the intersection safely.

Further, in the driving assistance method and device according to this embodiment, the situations at the crosswalks at the intersection where the host vehicle is approaching are detected and whether or not the host vehicle will need to make a temporary stop at the intersection is determined based on the situations at the crosswalks. Thus, by taking into account the presence of pedestrians and bicycles, it is possible to more accurately determine whether or not a temporary stop will be needed at the intersection.

Also, in the driving assistance method and device according to this embodiment, any oncoming vehicle that is to enter the intersection where the host vehicle is approaching is detected, and whether or not the host vehicle will need to make a temporary stop at the intersection is determined in accordance with the gap time between the time when the oncoming vehicle passes the intersection and the time when the host vehicle passes the intersection. In this way, it is possible to make a natural determination on whether or not to make a temporary stop in a situation where there is an approaching oncoming vehicle.

Further, in the driving assistance method and device according to this embodiment, an approval reception zone is set before the intersection where the host vehicle is approaching, and the host vehicle is caused to make a temporary stop at the intersection if approval to pass through the intersection is not received within the approval reception zone from the occupant. Thus, the timing to receive approval is defined, and the host vehicle is caused to make a temporary stop if approval is not received within this zone. This can improve safety.

Also, in the driving assistance method and device according to this embodiment, whether or not it is necessary to request the occupant to approve passage through the intersection is determined based on the situation at the intersection, and the occupant is not requested to approve passage through the intersection if it is determined that it is not necessary to do so. In this way, the occupant is not requested for approval in a situation where the host vehicle can safely pass through the intersection without the occupant's approval. This can reduce the annoyance experienced by the occupant.

Note that the above embodiment is one example of the present invention. Thus, the present invention is not limited to the above embodiment but various changes can be made in accordance with the design and so on as modes other than this embodiment without departing from the technical idea of the present invention, as a matter of course. For example, although the above embodiment has been described by taking as an example a case where left-hand traffic is employed, the present invention is applicable similarly to cases where right-hand traffic is employed, as a matter of course.

REFERENCE SIGNS LIST 1 driving assistance device
3 travel state detection unit
5 surrounding situation detection unit
7 approval reception switch
9 information presenting unit
11 actuator
21 intersection situation detector
23 temporary stop determination unit
25 approval execution unit
27 autonomous driving execution unit
100 driving assistance system

The invention claimed is:

1. A driving assistance method for an autonomous vehicle that requests an occupant in a host vehicle to approve passage through an intersection and, upon receiving approval from the occupant, controls the host vehicle to pass through the intersection, the method comprising:
   detecting a situation at the intersection where the host vehicle is approaching;
   determining that the host vehicle will need to make a temporary stop at the intersection, based on the situation at the intersection;
   extending a time period to request the occupant to approve passage through the intersection as compared to timing that is used when the temporary stop is not needed;
   requesting the occupant to approve passage through the intersection when the extended time period has lapsed; and
   controlling the host vehicle to pass through the intersection.

2. The driving assistance method according to claim 1, further comprising:
   detecting a change in the situation at the intersection;
   determining that the change in the situation indicates that the temporary stop is no longer needed; and
   requesting the occupant to approve passage through the intersection.

3. The driving assistance method according to claim 1, further comprising:
   when the determining that the temporary stop will be needed based on the situation at the intersection occurs after the occupant has already been requested to approve passage through the intersection, detecting a change in the situation at the intersection;
   determining that the change in the situation at the intersection indicates that the temporary stop is no longer needed; and
   requesting the occupant again to approve passage through the intersection.

4. The driving assistance method according to claim 1, further comprising:
   after determining that the temporary stop will be needed based on the situation at the intersection, causing the host vehicle to make the temporary stop at the intersection regardless of whether the occupant has been requested to approve passage through the intersection or whether approval to pass through the intersection has been received from the occupant.

5. The driving assistance method according to claim 4, further comprising:
   presenting a reason for the temporary stop to the occupant at least aurally or visually, regardless of whether the occupant has been requested to approve passage through the intersection or whether approval to pass through the intersection has been received from the occupant.

6. The driving assistance method according to claim 1, further comprising:
   when the host vehicle is to turn at the intersection, turning on a direction indicator of the host vehicle regardless of whether the occupant has been requested to approve passage through the intersection or whether approval to pass through the intersection has been received from the occupant.

7. The driving assistance method according to claim 1, wherein detecting the situation at the intersection comprises detecting traffic congestion of an oncoming lane of a road on which the host vehicle is traveling, and
   determining that the host vehicle will need to make the temporary stop at the intersection when the oncoming lane is congested.

8. The driving assistance method according to claim 7, wherein detecting traffic congestion of the oncoming lane is performed between the host vehicle and the intersection.

9. The driving assistance method according to claim 7, wherein detecting traffic congestion of the oncoming lane is performed before the intersection where the host vehicle is approaching is congested is detected.

10. The driving assistance method according to claim 7, wherein detecting the traffic congestion of the oncoming lane is performed beyond the intersection where the host vehicle is approaching.

11. The driving assistance method according to claim 1, further comprising:
    detecting a display state of a traffic signal at the intersection where the host vehicle is approaching; and
    determining that the host vehicle will need to make the temporary stop is further based on the display state of the traffic signal.

12. The driving assistance method according to claim 11, wherein when the display state is detected as indicating a passage permission is detected from a traffic signal dedicated for right-left turn, determining that the host vehicle will not need to make the temporary stop.

13. The driving assistance method according to claim 1, wherein the situation at the intersection is a predicted situation at a time when the host vehicle passes a position of a stop line at the intersection.

14. The driving assistance method according to claim 1, wherein
    the detected situation at the intersection is a crosswalk situation at the intersection where the host vehicle is approaching.

15. The driving assistance method according to claim 1, wherein
    the detected situation at the intersection is an oncoming vehicle that is to enter the intersection where the host vehicle is approaching, the method further comprising:
    calculating a gap time between a time when the oncoming vehicle passes the intersection and a time when the host vehicle passes the intersection, and
    determining that the host vehicle will need to make the temporary stop is determined in accordance with the gap time.

16. The driving assistance method according to claim 1, further comprising:
    setting an approval reception zone before the intersection where the host vehicle is approaching, the approval reception zone being a zone within which approval to pass through the intersection is received from the occupant; and causing the host vehicle to make the temporary stop at the intersection if the approval to pass through the intersection is not received within the approval reception zone.

17. The driving assistance method according to claim 1, further comprising:

determining a necessity of a request to the occupant to approve passage through the intersection, based on the situation at the intersection; and when a result is no necessity, requesting the occupant to approve passage through the intersection will not occur.

18. A driving assistance device for an autonomous vehicle that requests an occupant in a host vehicle to approve passage through an intersection and, upon receiving approval from the occupant, controls the host vehicle to pass through the intersection, the device comprising:

a detector that detects a situation at the intersection where the host vehicle is approaching; and a controller configured to:

determine that the host vehicle will need to make a temporary stop at the intersection, based on the situation at the intersection;

extending a time period to request the occupant to approve passage through the intersection as compared to timing that would be used when the temporary stop is not needed; and request the occupant to approve passage through the intersection when the extended time period has lapsed, wherein the host vehicle is operated to pass through the intersection based on an approval.

19. The driving assistance method according to claim 1, further comprising:

determining that the temporary stop will not be needed based on the situation at the intersection;

requesting the occupant to approve passage through the intersection at a timing when the host vehicle has approached within a predetermined distance or a predetermined time from the intersection;

in response to not receiving approval, requesting again the occupant to approve passage through the intersection at a later timing than the timing when the host vehicle has approached the intersection.

* * * * *